Patented Oct. 6, 1931

1,826,094

UNITED STATES PATENT OFFICE

HERMANN SCHUETTE, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF SYNTHETIC TANNING AGENTS

No Drawing. Application filed March 14, 1929, Serial No. 347,157, and in Germany March 31, 1928.

The present invention relates to the production of synthetic tanning agents.

I have found that a new group of valuable synthetic tanning agents can be obtained by condensing a methylol compound of an aromatic hydroxy-carboxylic acid with resorcinol at a temperature below 50° C. in the presence of water and, preferably, of small amounts of a condensing agent either of acid or alkaline nature. The amount of condensing agent to be employed varies with the temperature employed, smaller amounts being employed on working at a higher temperature, whereas on working at a lower temperature the amount of condensing agent can be increased without producing water-insoluble products. The products obtained according to this invention have very good tanning properties and differ from most of the artificial tanning materials hitherto known, by the absence of the sulpho group.

The methylol compounds of the aromatic carboxylic acids employed as initial materials may be prepared in any convenient manner, for example, corresponding to the particulars given in the U. S. Patent Nos. 526,786 and 563,975 by condensing an aromatic hydroxy-carboxylic acid, instead of the phenols referred to in the said patents, with formaldehyde or substances which give off formaldehyde, such as methylal (formaldehyde methyl acetal), trioxymethylene and the like, in the presence of neutral or alkaline condensing agents; thus, for instance, an aqueous solution containing up to 5 or 6 molecular proportions of formaldehyde may be allowed to act upon 1 molecular proportion of the hydroxy-carboxylic acid. According to the process of the present invention the methylol compounds obtained by a process of this kind need not be isolated from the aqueous solution as the solution may be brought directly into reaction with resorcinol. The amount of resorcinol to be employed per each molecular proportion of the methylol compound is preferably chosen so as to be sufficient to provide 1 molecular proportion of resorcinol for each methylol group present in the methylol compound of the aromatic hydroxy-carboxylic acid, but it may also be smaller.

This method of operation furnishes a variety of products which, according to the nature and amount of the initial materials, depending, for example, on the amount of the resorcinol on the one hand and on the amount of formaldehyde employed in the preparation of the methylol compound on the other hand, differ among themselves by the degree of their solubility in water. The tanning agents prepared with larger amounts of resorcinol and with methylol compounds which are richer in methylol groups, are readily soluble in water, and produce a light colored leather of good body and in a high yield, which is practically equivalent to that obtained with the aid of weight-giving vegetable tanning extracts. The tanning agents prepared from smaller quantities of resorcinol and from methylol compounds with fewer methylol groups are less soluble in water and are comparable with the sparingly soluble quebracho extract. The last named condensation products in particular are preferably employed for tanning in the presence of the well known dispersive sulphonic acids, such as aromatic sulphonic acids of high molecular weight or condensation products of sulphonic acids with formaldehyde and the like, which may also possess tanning properties, in which case also a firm, compact and weighty leather of excellent character is produced. The new tanning agents may also be used, with advantage, in admixture with other tanning or non-tanning substances usually employed in tanning processes, such as vegetable tanning agents, fillers or buffer substances.

The following examples further illustrate the nature of this invention which, however, is not restricted thereto.

Example 1

A solution of 13.8 kilograms of salicylic acid in 80 liters of a 10 per cent solution of caustic soda is treated with 30 kilograms of a 30 per cent aqueous formaldehyde solution, then made up to 160 liters with water and left to stand at room temperature until the smell of the formaldehyde has disappeared. After neutralizing with dilute sulphuric acid, a solution of 33 kilograms of resorcinol and 2 liters of concentrated hydrochloric acid in 44.5 kilograms of water is added, the solution being then left to stand for a considerable time at room temperature, after which time the bulk of the water is expelled in vacuo. The reaction product is obtained in the form of a red-brown extract which is readily soluble in water. With a content of 67 per cent of dry substance, it contains, according to the hide-powder filter test, 35.5 per cent of tanning and 31.5 per cent of non-tanning substances. When employed for tanning it furnishes a pale reddish, firm leather, which handles well and possesses high tensile strength.

*Example 2*

The methylol compound prepared, as in Example 1, from 13.8 kilograms of salicylic acid, 80 liters of a 10 per cent caustic soda solution and 30 kilograms of 30 per cent formaldehyde solution, is treated, after neutralization with dilute sulphuric acid, with a solution of 44 kilograms of resorcinol and 2 liters of concentrated hydrochloric acid in 60 kilograms of water. After prolonged standing at room temperature, the bulk of the water is expelled in vacuo, and the reaction product is obtained as a red-brown extract, readily soluble in water. With a content of about 75 per cent of dry matter, it contains, according to the hide-powder filter test, 51.7 per cent of tanning and 24.0 per cent of non-tanning substances. When used in tanning, it furnishes a leather with the valuable properties described in Example 1.

*Example 3*

A solution of 15.2 kilograms of p-cresotinic acid in 80 liters of a 10 per cent caustic soda solution, is treated with 20 kilograms of 30 per cent aqueous formaldehyde solution and made up to 160 liters with water. After the smell of formaldehyde has disappeared, a solution of 22 kilograms of resorcinol in 30 kilograms of water is added. When the mixture has stood for several days at room temperature, it is rendered acid to litmus, and the bulk of the water is expelled in vacuo, whereupon the reaction product is left behind as a semi-solid reddish yellow mass, which, with a content of about 85 per cent of dry matter, contains, according to the hide-powder filter test, 47.2 per cent of tanning and 37.6 per cent of non-tanning substances. When used for tanning, it furnishes a full, pale reddish leather which handles well and soft.

*Example 4*

The methylol compound, prepared, as in Example 3, from 15.2 kilograms of p-cresotinic acid, 80 liters of a 10 per cent caustic soda solution and 30 kilograms of a 30 per cent aqueous formaldehyde solution, is further treated with a solution of 33 kilograms of resorcinol in 44.5 liters of water. After being acidified until slightly acid to litmus, the bulk of the water is expelled at a moderate temperature in vacuo. The condensation product is obtained as a semi-solid reddish-yellow mass which, with a content of about 75 per cent of dry matter contains, according to the hide-powder filter test, 52 per cent of tanning and 24 per cent of non-tanning substances, and when employed for tanning, furnishes a leather with the excellent properties specified in Example 3.

What I claim is:

1. The process of producing water-soluble synthetic tanning agents which comprises condensing a methylol compound of an aromatic hydroxy-carboxylic acid with resorcinol at a temperature below 50° C. in the presence of water.

2. The process of producing water-soluble synthetic tanning agents which comprises condensing a methylol compound of an aromatic hydroxy-carboxylic acid in aqueous solution with resorcinol at a temperature below 50° C. and in the presence of a small amount of a condensing agent.

3. The process of producing water-soluble synthetic tanning agents which comprises condensing, at a temperature below 50° C. and in the presence of water, a methylol compound of an aromatic hydroxy-carboxylic acid with an amount of up to one molecular proportion of resorcinol per each methylol group contained in the aforesaid methylol compound.

4. The process of producing water-soluble synthetic tanning agents which comprises condensing, at a temperature below 50° C. and in the presence of a small amount of a condensing agent and of water, a methylol compound of an aromatic hydroxy-carboxylic acid with an amount of up to one molecular proportion of resorcinol per each methylol group present in the aforesaid methylol compound.

5. The process of producing water-soluble synthetic tanning agents which comprises condensing, at a temperature below 50° C. and in the presence of water and of a small amount of an acid condensing agent, a methylol compound of an aromatic hydroxy-carboxylic acid with an amount of up to one molecular proportion of resorcinol per each methylol group present in the aforesaid methylol compound.

6. As new articles of manufacture synthetic tanning agents comprising a water-soluble condensation product of a methylol compound of an aromatic hydroxy-carboxylic acid with resorcinol.

7. As new articles of manufacture synthetic tanning agents comprising a water-soluble condensation product of a methylol compound of an aromatic hydroxy-carboxylic acid with an amount of up to one molecular proportion of resorcinol per each methylol group present in the aforesaid methylol compound.

8. As a new article of manufacture, a water-soluble condensation product of a methylol compound of an aromatic hydroxy-carboxylic acid with resorcinol.

9. As a new article of manufacture, a water-soluble condensation product of a methylol compound of an aromatic hydroxy-carboxylic acid with an amount of up to one molecular proportion of resorcinol for each methylol group present in the aforesaid methylol compound.

10. As a new article of manufacture, a water-soluble condensation product of a methylol compound of salicylic acid with resorcinol.

11. As a new article of manufacture, a water-soluble condensation product of a methylol compound of p-cresotinic acid with resorcinol.

In testimony whereof I have hereunto set my hand.

HERMANN SCHUETTE.